United States Patent [19]
Hickox

[11] Patent Number: 5,875,075
[45] Date of Patent: Feb. 23, 1999

[54] BIDIRECTIONAL CAM LOCK INERTIAL LATCH FOR A DISC DRIVE ACTUATOR

[75] Inventor: Thomas A. Hickox, Scotts Valley, Calif.

[73] Assignee: Seagate Technology, Inc., Scotts Valley, Calif.

[21] Appl. No.: 873,575

[22] Filed: Jun. 12, 1997

Related U.S. Application Data

[60] Provisional application No. 60/043,097 Apr. 15, 1997.

[51] Int. Cl.$^6$ .................................................. G11B 5/54
[52] U.S. Cl. ............................................................ 360/105
[58] Field of Search ..................................... 360/104–106

[56] References Cited

U.S. PATENT DOCUMENTS

| | | | |
|---|---|---|---|
| 4,996,617 | 2/1991 | Yaeger et al. | 360/105 |
| 5,543,986 | 8/1996 | Albrecht | 360/105 |
| 5,715,119 | 2/1998 | Williams et al. | 360/105 |

*Primary Examiner*—Allen T. Cao
*Attorney, Agent, or Firm*—Edward P. Heller, III; Raghunath S. Minisandram

[57] ABSTRACT

An improved inertial latching system for the actuator in a disc drive. The inertial latching system of the present invention includes an unbalanced inertial member which rotates in response to translational or rotational mechanical shocks applied to the disc drive. The inertial member rotates in either a first or second direction, dependent on the direction of the applied mechanical shock, and includes corresponding first and second contact surfaces for engaging a cooperative feature on the moving portion of the actuator. The contact surfaces are configured to act as camming surfaces which compensate for tolerance clearances in the latching system and provide latching power proportional to the amount of applied mechanical shock. The inertial member also includes a centering mechanism for returning the inertial member to a passive rest position in the absence of and at the termination of applied mechanical shocks.

14 Claims, 6 Drawing Sheets

BIDIRECTIONAL CAM LOCK INERTIAL LATCH FOR A DISC DRIVE ACTUATOR

CROSS REFERENCE TO RELATED APPLICATIONS

This application claims the benefit of United States Provisional Application Number 60/043,097, filed Apr. 15, 1997.

FIELD OF THE INVENTION

This invention relates generally to the field of hard disc drive data storage devices, and more particularly, but not by way of limitation, to an improved latching mechanism for securing the actuator of a disc drive data storage device at one extreme of its defined range of motion.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

When power to the disc drive is lost, servo control of the current flow in the coil of the voice coil actuator is also terminated. In the absence of DC current flowing in the coil, the actuator is free to move in response to such things as mechanical shock, air movement within the disc drive or mechanical bias applied to the actuator by the printed circuit cable (pcc) used to carry signals to the coil and to and from the heads mounted on the actuator. Since a power loss also means that the spindle motor will also cease to rotate the discs, the air bearing supporting the heads also begins to deteriorate and contact will be made between the heads and the discs. Because of this, it is common practice in the industry to monitor input power to the disc drive, and, at the detection of power loss, to drive the actuator to a park position and latch it there until power to the disc drive is restored.

It is also well known to use the back electromotive force (BEMF) generated by the inertia of the spinning discs and spindle motor components to generate the power to move the actuator to a park position, and the park position is typically selected to be at a location which places the heads closely adjacent the hub of the spindle motor. By parking the heads toward the inner diameter of the discs, the amount of power necessary to overcome the frictional drag of the heads on the discs at power-up is minimized.

An alternative approach to protecting the heads and discs in the event of a power loss to the disc drive is to utilize a ramping system closely adjacent the outer diameter of the discs to remove the heads from engagement with the discs. The actuator is parked with the heads supported by the ramps and latched in this position until power to the disc drive is restored. Upon re-establishment of power to the disc drive, the actuator is unlatched, and the heads are loaded back into engagement with the discs onto an established air bearing. In disc drives utilizing such ramp loading and unloading systems, the heads and discs should never come into direct contact.

The present invention may be implemented in either a disc drive which parks the heads in contact with the discs at a predefined park zone or in a disc drive which parks the heads on ramps away from direct contact with the discs.

The principal requirements of an actuator latch mechanism are that it hold the actuator at the park position in the presence of a defined maximum specified amount of mechanical shock during the time interval when power is not applied, and that the latching mechanism be capable of releasing the actuator once power has been reapplied to the disc drive and the spindle motor brought back up to operational speed. Many forms of latches to hold the actuator at the park position have been used and are disclosed in the art. These include magnetic latches, solenoid-activated latches, shape-memory metal latches and aerodynamically activated latches. For a representative review of several prior art actuator latches, the reader is directed to U.S. Pat. Nos. 5,612,842, issued Mar. 18, 1997, 5,581,424, issued Dec. 3, 1996, 5,555,146, issued Sep. 10, 1996, 5,365,389, issued Dec. 15, 1994, 5,361,182, issued Dec. 1, 1994, 5,313,354, issued May 17, 1994, 5,262,912, issued Nov. 16, 1993 and 5,231,556, issued Jul. 27, 1993, all assigned to the assignee of the present invention and all incorporated herein by reference.

Another type of actuator latching mechanism that has seen increasing usage is referred to generally as an inertial latch. Examples of inertial latching mechanisms for the actuator in disc drives are described in detail in U.S. Pat. No. 5,296,986, issued Mar. 22, 1994 to Morehouse, et al., U.S. Pat. No. 5,404,257, issued Apr. 4, 1995 to Alt, U.S. Pat. No. 5,612,842, issued Mar. 18, 1997 to Hickox, et al. and U.S. Pat. No. 5,623,384, issued Apr. 22, 1997 also to Hickox, et al. The latter two of these references are also assigned to the assignee of the present invention and incorporated herein by reference.

In a typical inertial latch, such as those described in the above cited references, the inertial element used to contact and hold the actuator against movement as a result of applied mechanical shock is a completely passive device. That is, it does not contact the moving portion of the actuator in any way until a mechanical shock is experienced by the disc drive. Because of this, it is common practice in the industry to employ a secondary latching device in the disc drive. This secondary latching device is used to hold the actuator in its designated park position in the presence of small internally generated forces which would tend to move the actuator from its park position onto the portion of the disc surface used for data recording. Examples of such small internally generated forces include, but are not limited to, 1) any bias force exerted on the moving portion of the actuator by the pcc used to electrically and electronically connect the moving portion of the actuator to circuitry on the non-moving portion of the disc drive; 2) any aerodynamic force applied to the moving portion of the actuator as a result of the spinning of the discs; and 3) any frictional force, felt between the heads and spinning discs when the discs are spinning too slowly to fly the heads in their normal manner, which tends to move the actuator moving portion to a position, usually associated with the approximate middle of the data recording area of the discs, where the frictional force is tangent to a data track and on a line that passes through the pivot axis of the actuator. A person of skill in the art will appreciate that such forces are relatively small in relationship to the amounts of applied mechanical shock that a disc drive of the current generation is expected to experience without allowing the actuator to unlatch. As an example, typical disc drives which are intended for use in laptop computer systems are specified to withstand applied mechanical shocks of 200 G or greater without damage or disengagement of the actuator from an intended park position.

Because the secondary latching mechanism of a disc drive is intended primarily to overcome only small internally generated forces, such as those described above, the burden for maintaining the moving portion of the actuator at the latch position in the presence of specified amounts of applied mechanical shock is assumed by the inertial latching element in an inertial latching system. Because, ideally, the inertial element is completely passive in the absence of applied mechanical shock, it is common that some spacing, or clearance, exist between the contact surface of the inertial element and the corresponding contact feature on the moving portion of the actuator, in order to allow for manufacturing tolerances in the associated components and to assure that the inertial element can move into its latching position relative to the moving portion of the actuator in response to experienced mechanical shock. The inclusion of such a clearance in an inertial latch design, however, allows for unintended unlatching of the actuator under certain conditions.

The following discussion assumes, as an example, that the disc drive includes a relatively weak magnetic secondary latching mechanism for holding the actuator at the park position in the presence of relatively weak internally generated forces, such as those noted above. When power to the disc drive is removed, it is common in the industry, as noted above, to use the BEMF generated by the spindle motor to provide power to move the actuator to its park position, as noted above. However, at some point in the powering down of the disc drive, there will not be sufficient BEMF to hold the actuator at its park position. The secondary latching mechanism however is engaged once the actuator is initially moved to the park position, and will be strong enough to hold the actuator at the park position against the small internally generated forces.

When a relatively large mechanical shock is applied to the disc drive in a direction which tends to move the actuator away from the latched position toward the data recording area of the discs, the inertial element of an inertial latching system moves in response to the mechanical shock into a position where it will engage the moving portion of the actuator and hold it against the mechanical shock. If, however, the clearance or spacing noted above is present in the inertial latch design, it is possible for the actuator to disengage from the secondary latching mechanism, and there is no force present in the system to move the actuator back into engagement with the secondary latching system upon termination of the applied mechanical shock. Once the mechanical shock event ends, the inertial element of the inertial latching system moves back out of engagement with the actuator to its quiescent passive position, and the actuator, freed from the secondary latching mechanism, is subject to movement onto the data recording portion of the discs by the internally generated forces. Indeed, this exact behavior has been observed with certain designs of inertial latches through the use of high speed video recording.

Similarly, applied mechanical shock exerted on the disc drive in a direction tending to force the actuator toward the latch position and away from the data recording area of the discs can also result in unintended unlatching of the actuator. This is because, as noted above, the limit stops that define the nominal extremes of the range of motion of the actuator include some amount of compliance in order to provide a "soft" stopping of the actuator and to prevent damage to the delicate gimbal assemblies used to support the heads. If the applied mechanical shock causes the compliance in the limit stop to be taken up, upon termination of the mechanical shock event, the resilience in the limit stop acts to drive the actuator back toward the data recording area of the discs, and, if the force exerted by the compliant limit stop is great enough, the secondary latching mechanism can be overcome, once again leaving the actuator free to move onto the data recording portion of the discs in response to the internally generated forces. This type of unintended unlatching of the actuator has also been observed through the use of high speed video recording.

Clearly a need exists for a latching system to hold the actuator of a disc drive at a park position, and maintain the actuator at the park position in the presence of any specified applied mechanical shock, and which is passive in the absence of mechanical shocks applied to the disc drive, and overcomes the shortcomings of prior art inertial latching systems noted above.

SUMMARY OF THE INVENTION

The present invention is an improved inertial latching system for the actuator in a disc drive. The inertial latching system of the present invention includes an unbalanced inertial member which rotates in response to translational or rotational mechanical shocks applied to the disc drive. The inertial member rotates in either a first or second direction, dependent on the direction of the applied mechanical shock, and includes corresponding first and second contact surfaces for engaging a cooperative feature on the moving portion of the actuator. The contact surfaces are configured to act as camming surfaces which compensate for tolerance clearances in the latching system and provide latching power proportional to the amount of applied mechanical shock. The inertial member also includes a centering mechanism for returning the inertial member to a passive rest position in the absence of and at the termination of applied mechanical shocks.

It is an object of the invention to provide a latching system for securing the actuator of a disc drive at a latched position.

It is another object of the invention to provide a latching system which prevents the disengagement of the actuator as a result of the application of translational or rotational mechanical shocks to the disc drive.

It is another object of the invention to provide a latching system which requires no electronic controls for operation.

It is another object of the invention to provide a latching system which is totally passive in the absence of applied mechanical shocks, and only engages the actuator in response to such applied mechanical shocks.

It is another object of the invention to provide a latching system for the actuator of a disc drive that can be implemented at minimal cost.

These objects, along with other features and benefits of the invention, can best be understood by a review of the following DETAILED DESCRIPTION OF THE INVENTION when read in conjunction with a study of the accompanying drawings.

BRIEF DESCRIPTION OF THE DRAWINGS

FIGS. 3-1 through 3-4 are a top plan view, a side elevation view, a bottom plan view and a front elevation view, respectively, of an inertial member which forms a portion of the latching system of the present invention.

DETAILED DESCRIPTION OF THE INVENTION

Figure 1:
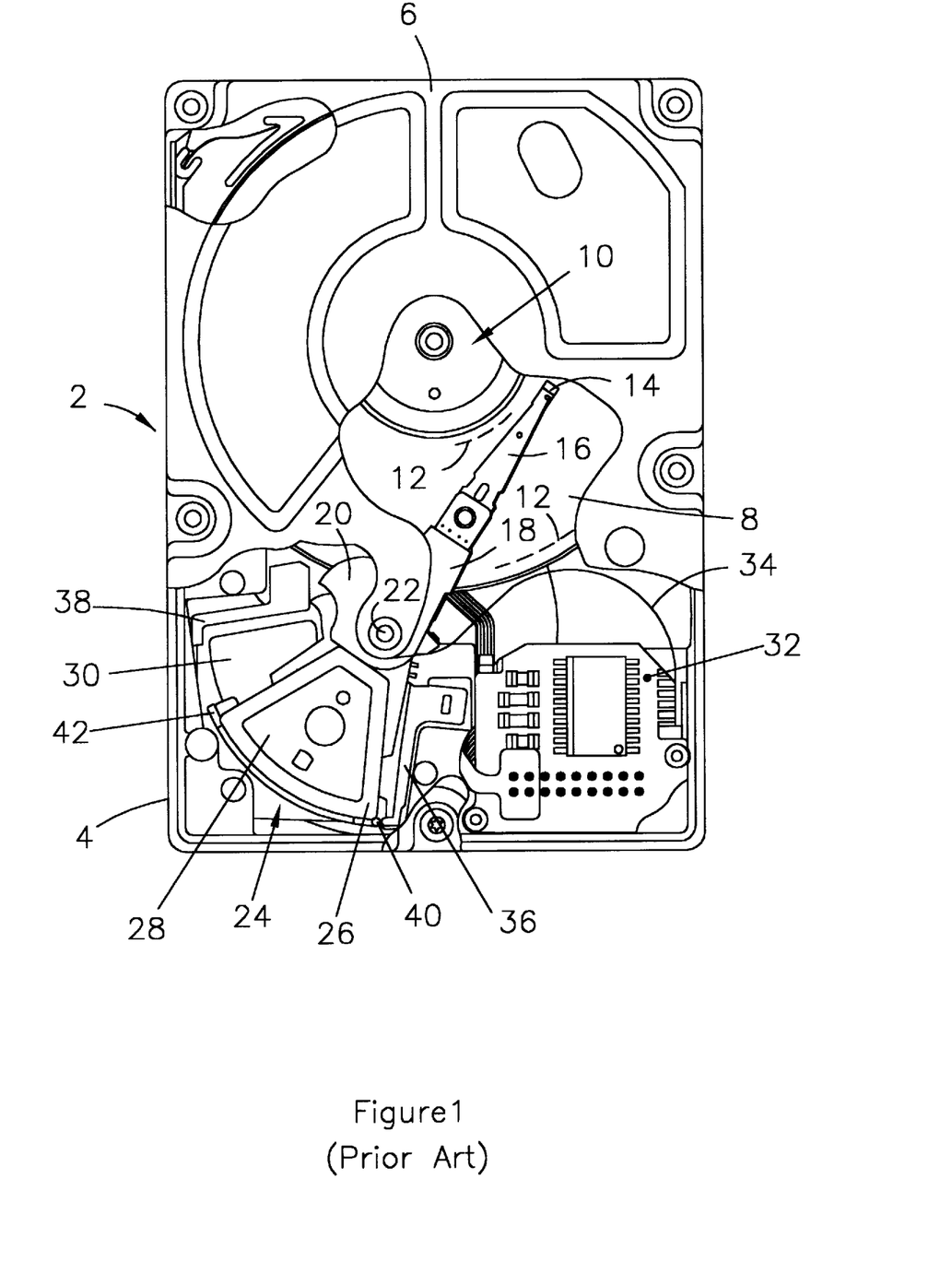
FIG. 1 is a top plan view of a prior art disc drive in which the present invention is particularly useful.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil 26 formed around a bobbin 28 and supported by the actuator bearing housing 20 within the magnetic field of an array of permanent magnets, one of which is shown at 30, which are fixedly mounted to the base member 4, all in a manner well known in the industry. Electronic circuitry (partially shown at 32, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 34.

The disc drive 2 also includes a prior art limit stop system consisting of an inner limit stop/latch 36, an outer limit stop 38 and, integrally molded onto the coil 26, inner and outer contact features 40, 42, respectively. The figure shows the actuator at its innermost position relative to the discs 8, with the inner limit stop/latch 36 contacting the inner contact feature 40. It will be apparent to one of skill in the art that, if the actuator were to be rotated about the pivot shaft 22 to its outermost position, with the heads 14 closely adjacent the outer diameter of the discs 8, the outer contact feature 42 would contact the outer limit stop 38. Thus the extremes of the range of motion of the actuator of the disc drive 2 are defined by the inner and outer limit stops 36, 38 in cooperation with the inner and outer contact features 40, 42 carried by the movable coil 26. Additional details of this prior art limit stop/latch system, including the manner in which compliance in the limit stops is achieved, can be found in previously incorporated U.S. Pat. No. 5,262,912, issued Nov. 16, 1993.

Figure 2:
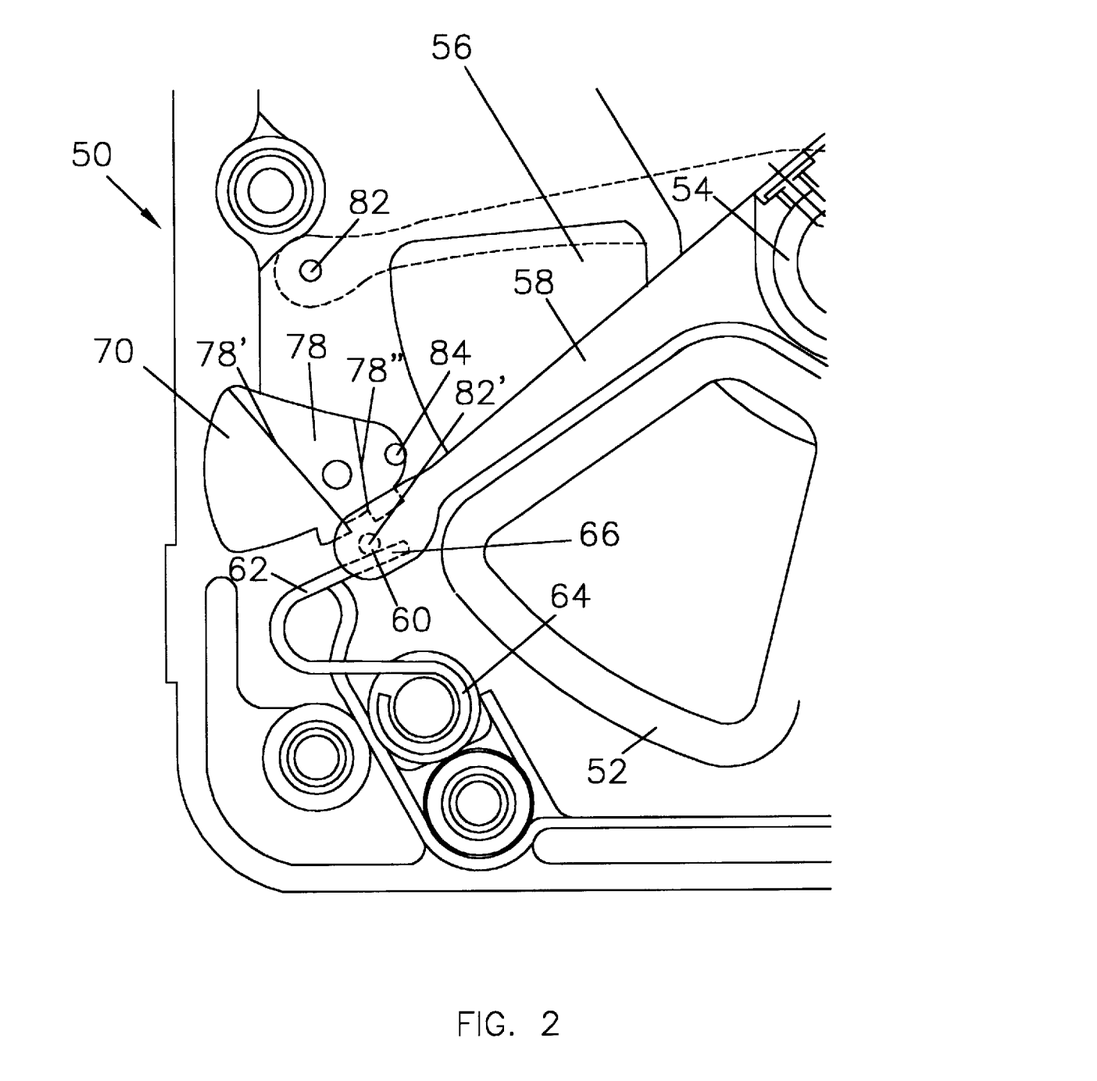
FIG. 2 is a detail plan view of a portion of a disc drive incorporating the latching system of the present invention.

Turning now to FIG. 2, shown is a detail plan view of a portion of a disc drive 50 incorporating the latching system of the present invention. In the embodiment of the present invention shown in FIG. 2, and as will be discussed in more detail below with regard to other figures, the disc drive 50 is of the type that parks the heads near the inner diameter of the discs and in contact with the disc surfaces. It will be apparent to one of skill in the art, however, that the present invention is not limited to use in such disc drives and can be implemented as readily in disc drives that park the heads supported by ramp structures adjacent the outer diameter of the discs.

In FIG. 2, the disc drive 50 can be seen to included a voice coil motor (not separately designated) that consists of a flat movable coil 52 supported by an actuator bearing housing 54 in close proximity to an array of permanent magnets (one of which is shown at 56), all in a manner well known in the industry. The moving portion of the actuator can also be seen to include a latch pin arm 58 which supports a magnetically permeable latch pin 60 at its distal end. When the moving portion of the actuator is brought to its park position as shown in the figure, the latch pin 60 contacts a magnetic flux concentrator 62. The magnetic flux concentrator 62 functions similarly to that shown in previously incorporated '912 patent. That is, magnetic flux from the actuator permanent magnet 56 is collected at a first end 64 of the magnetic flux concentrator 62 and is thus expressed along its length to a second end 66 which lies in the path of motion of the latch pin 60. Thus when the actuator is moved to the position shown in the figure, a magnetic attraction exists between the latch pin 60 and the magnetic flux concentrator 62 which tends to hold the actuator at the latched position.

A major difference between the magnetic latching mechanism of the previously incorporated '912 patent and the secondary magnetic latching mechanism of the present invention, however, is that the magnetic latching mechanism is envisioned to be relatively weak. That is, while the magnetic latch described in the previously incorporated '912 patent was intended to hold the actuator at the latched position in the presence of a specified range of applied mechanical shock, the magnetic latching mechanism of the present invention is not intended, by itself, to provide all of the latching capability of the disc drive, and is included with the inertial latching system of the present invention principally to provide enough latching power to hold the actuator at its latched position against the relatively small forces internal to the disc drive which tend to move the actuator away from the latched position, and to allow a reaction time after the start of a mechanical shock event for the inertial latching system to activate. Examples of these small forces within the disc drive include any mechanical bias applied to the moving portion of the actuator by the pcc (34 in FIG. 1), and any aerodynamic forces applied to the moving portion of the actuator as a result of the spinning of the disc during power down or power up operations. It will be apparent to a person of skill in the art that such internal forces are minuscule when compared to the forces exerted on the actuator by applied mechanical shocks in the range typically specified for disc drives of the current generation. Thus the magnetic latching mechanism is sufficiently weak as to allow the actuator to controllably move away from the latched position when power to the disc drive has been restored and such movement is desired.

FIG. 2 also shows that the actuator latching system of the present invention includes an inertial member 70 mounted near the moving portion of the actuator and the magnetic latching mechanism. Before discussion of the operation of the inertial member, a description identifying various functional elements of the inertial member will be undertaken.

FIGS. 3-1 through 3-4 are a top plan view, a side elevation view, a bottom plan view and a front elevation view, respectively, of the inertial member 70 which forms a portion of the latching system of the present invention. In the figures, it can be seen that the inertial member 70 includes a pivot shaft 72 about which the inertial member will rotate in response to applied mechanical shocks, as will be discussed in more detail below.

Figure 31:
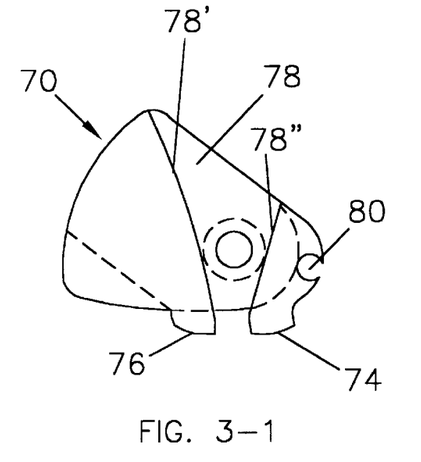
Figure 32:
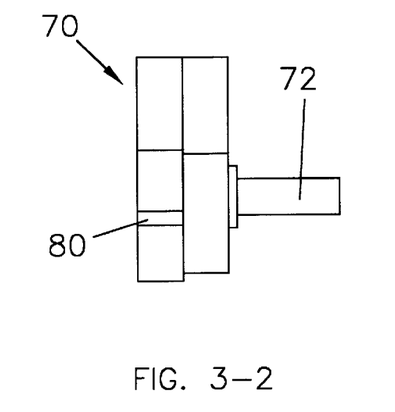
Figure 33:
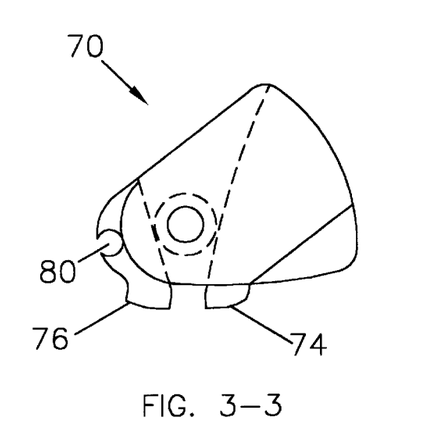

In the top and bottom plan views of FIGS. 3-1 and 3-3, respectively, the inertial member 70 is shown to be substantially wedge-shaped, and the location of the pivot shaft 72 relative to the overall wedge shape is shown to be clearly off-center and away from the center of gravity of the inertial member 70. The reason for this feature of the inertial member 70 will also become evident from the detailed discussion of the operation of the latching system of the present invention.

The inertial member 70 also includes a first or clockwise (CW) contact surface 74 and a second or counter-clockwise (CCW) contact surface 76. While discussion of the function of the CW and CCW contact surfaces 74, 76 will be made below, it should be pointed out here in the description of the elements of the inertial member 70 that the faces of the CW and CCW contact surfaces are presently envisioned to be arcs, but that the center of the arcs is not coincident with the central axis of the pivot shaft 72.

Figure 34:
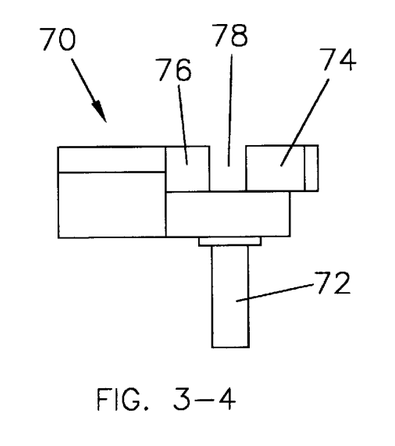

FIGS. 3-1, 3-3, and 3-4 in particular show that there is an interruption between the CW and CCW contact surfaces and that this interruption passes from the CW and CCW contact surfaces 74, 76 in a divergent manner to the opposite side of the inertial member 70. This interruption will be called a latch pin channel 78 when the operation of the latching system is described below.

One additional feature of the inertial member 70 is a cylindrical opening 80 that passes vertically through the narrow end of the wedge-shaped inertial member 70 in parallel with the pivot shaft 72. Once again, the function of this cylindrical opening 80 will be described in the operational description of the latching system of the present invention below.

It should also be mentioned that the entire inertial member 70 is presently envisioned to be molded as or machined from a single piece of material, and the material of the inertial member 70 is presently envisioned to be metal-injection-molded stainless steel, although an inertial member 70 formed of cast or machined brass or other materials would be considered to fall within the scope of the present invention, as long as the inertial member 70 functions as will be described below.

During the following description of the operation of the latching system of the present invention, repeated references will be made to rotational movement of various elements of the disc drive and to specific vertical relationships between certain elements of the disc drive and the elements of the latching system of the present invention. The reader may wish to refer to FIGS. 2, 5 and 6 for an understanding of rotational movement and component relationships related thereto, while understanding of the vertical relationship between various components can best be obtained by an examination of FIG. 4, wherein the various components are identified with the same numerical designators as used in FIGS. 2, 5 and 6.

Turning back now to FIG. 2, the inertial member 70 of the latching system of the present invention is shown in its quiescent or rest position. With the inertial member 70 in this rest position, the latch pin 60 located at the distal end of the latch pin arm 58 is free to move from its most clockwise position, as seen at numerical designator 82, to its most counterclockwise position at numerical designator 82'. It should be recalled that when the latch pin 60 is at 82', the heads at the opposite end of the moving portion of the actuator will also be at their most counterclockwise position, which in the example disc drive shown coincides with the park or latch position. Indeed, when the latch pin 60 is at 82', it contacts the flux concentrator 62 and is latched by the magnet attraction between these components.

FIG. 2 also shows that as the latch pin 60 passes from 82 to 82', it must pass the location of the inertial member 70. Such passage is facilitated by the fact that the inertial member 70 is located below the vertical position of the coil 52 (see FIG. 4), and by the fact that the path of the latch pin 60 as the actuator rotates lies coincident with the latch pin channel 78 in the top surface of the inertial member 70. It will also be apparent from FIG. 2 that if the inertial member 70 is rotated slightly away from the rest position shown in the figure for any reason, that the passage of the latch pin 60 into the latch pin channel 78 will result in contact between the latch pin 60 and one or the other of the divergent walls 78', 78" of the latch pin channel 78, tending to bring the inertial member 70 back to the rest position shown.

FIG. 2 also shows the mechanism used to bias the inertial member 70 toward and hold the inertial member at the rest position in the absence of applied mechanical shocks. Specifically, the cylindrical opening (80 in FIGS. 3-1 and 3-3) can be seen to hold a magnetically permeable bias element 84. This bias element 84 is acted upon by magnetic flux leaking from the permanent magnets, e.g. 56, of the VCM. The magnetic attraction between the bias element 84 and the permanent magnets 56 of the VCM acts to hold the inertial member 70 loosely at the rest position shown, and any tendency of the inertial member 70 to rotate away from this rest position is countered by the noted magnetic attraction.

Figure 4:
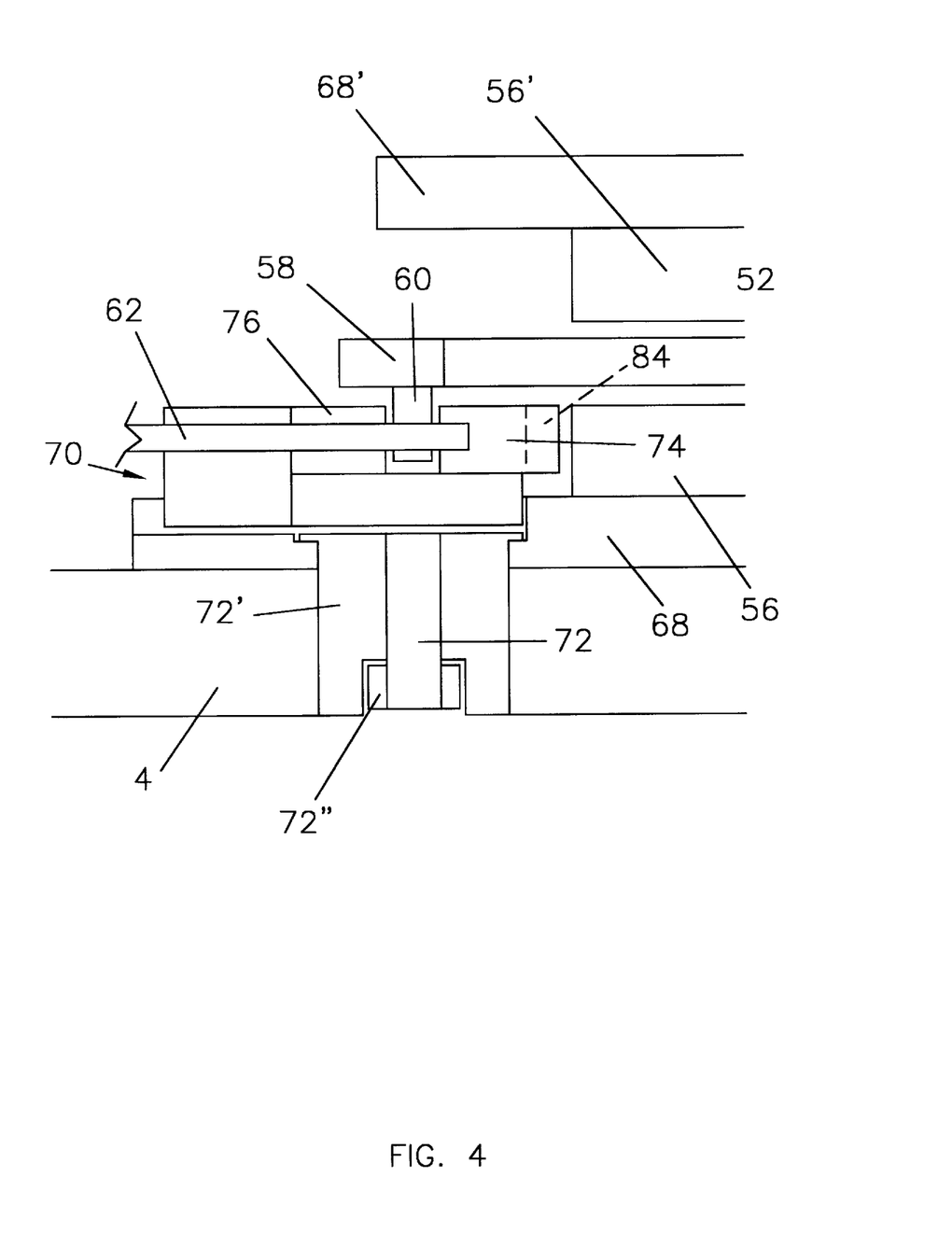
FIG. 4 is a diagrammatic elevation view of a portion of a disc drive incorporating the latching system of the present invention.

FIG. 4 is a simplified, diagrammatic elevation view of a portion of a disc drive incorporating the latching system of the present invention, and is included principally to illustrate the vertical relationship between various components of the disc drive. Looking first at the disc drive components common to prior art disc drives, FIG. 4 shows a portion of the housing base member 4 supporting a lower pole piece 68 of the VCM, which in turn supports a lower permanent magnet 56. A complementary upper pole piece and permanent magnet, 68' and 56', respectively, are also shown.

The latch pin arm 58, which carries the magnetically permeable latch pin 60, is shown lying in the vertical space between the lower and upper permanent magnets 56, 56' and, as will be appreciated by those of skill in the art, thus occupies the same vertical space as the coil (52 in FIG. 2) by which the position of the actuator is controlled. The latch pin 60 can be seen to overlap the vertical location of the flux concentrator 62 of the secondary magnetic latching system, and the view of FIG. 4 is taken from a point of view normal to the path of the latch pin 60 at the time that the actuator is in the park position shown in FIG. 2.

The inertial member 70 is also shown in the rest position of FIG. 2, and the CW and CCW latch surfaces 74, 76 can be seen to vertically overlap the length of the latch pin 60, while horizontally lying to either side of the latch pin 60. Thus the latch pin 60 is free to move past the inertial member 70 through the latch pin channel (not designated in FIG. 4, 78 in FIGS. 2 and 3) without causing contact between the latch pin 60 and the inertial member 70.

The pivot shaft 72 of the inertial member 70 can be seen to pass through a pivot bushing 72' which is press-fitted or adhesively bonded into an opening in the housing base member 4 and the lower pole piece 68. The distal end of the pivot shaft 72 is engaged by a locking ring 72", again either press-fitted or adhesively bonded to the pivot shaft 72, which holds the inertial member 70 in its intended vertical position, while still allowing free rotation of the inertial member 70 relative to the disc drive housing. In the presently preferred embodiment, the pivot bushing is envisioned to be machined from stainless steel, and as having a central opening dimensioned to fit loosely around the pivot shaft 72, thus providing a low amount of friction to be overcome in the rotation of the inertial member 70 in response to applied mechanical shocks. Furthermore, the figure shows that the distal end of the pivot shaft 72 and the lower surface of the locking ring 72" are slightly recessed from the corresponding lower surface of the housing base member 4. This allows a planar sealing element (not shown) to be placed over the location of the pivot bushing 72' to maintain the sealed integrity of the disc drive housing.

Finally, FIG. 4 again shows the position of the bias member 84, which is attracted by the lower permanent magnet 56 in order to draw the inertial member 70 to the rest position shown upon the termination of a mechanical shock event, and to hold the inertial member at this rest position in the absence of applied mechanical shocks.

From the foregoing discussion of FIGS. 2 and 4, it is apparent that in the absence of applied mechanical shocks, the actuator is free to move along its full designed range of motion, and that the inertial member 70 is normally held in its rest position and thus has no contact with or influence on the moving portion of the actuator.

The operation of the inertial latching system of the present invention will now be discussed, firstly as it acts in response to a rotational mechanical shock applied to the disc drive in a counterclockwise direction, and secondly as it acts in response to a rotational mechanical shock applied to the disc drive in a clockwise direction. In the ensuing discussions, it is assumed that the disc drive being described is of the type in which the heads are latched at a park position near the inner diameter of the discs and resting in contact with the disc surfaces. A person of skill in the art will, however, realize that the inertial latch of the present invention can also be readily implemented in disc drives which park the heads on ramp structures located adjacent the outer diameter of the discs.

Figure 5:
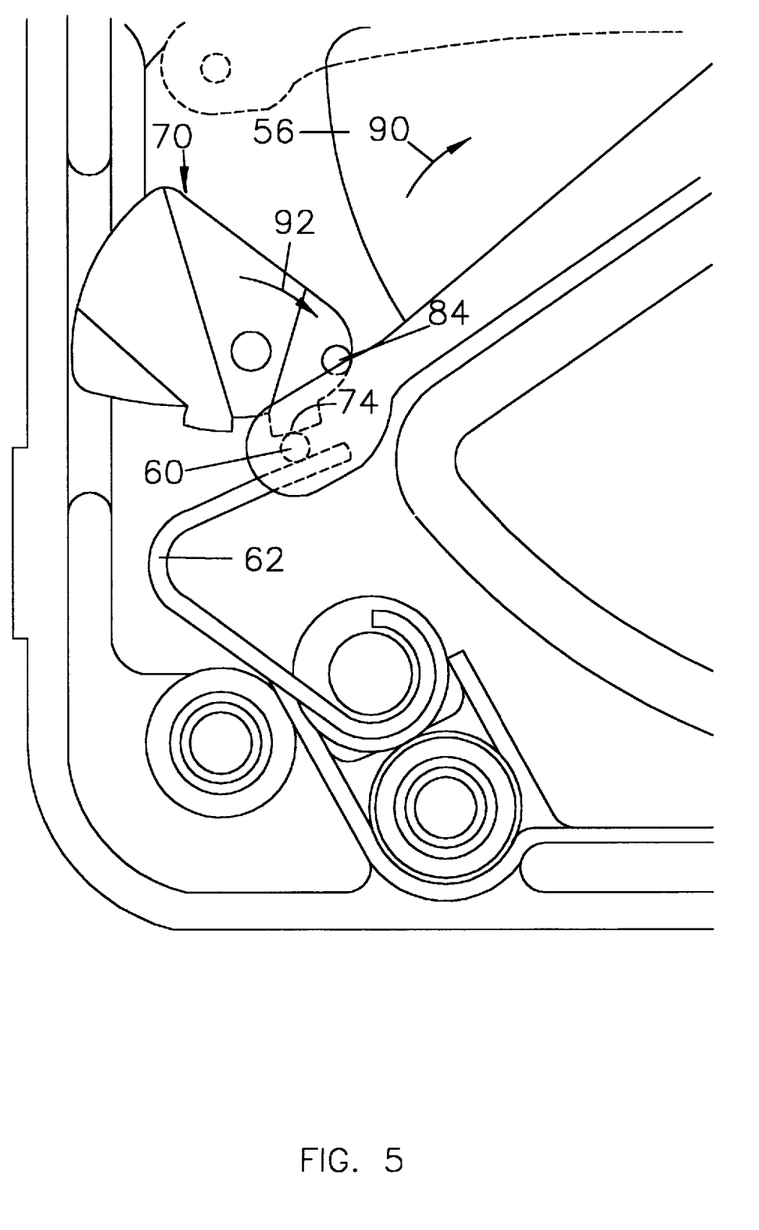
FIG. 5 is a detail plan view of a portion of a disc drive incorporating the latching system of the present invention, and showing the action of the latching system of the present invention in response to an applied mechanical shock which tends to rotate the actuator of the disc drive in a first direction.

Turning now to FIG. 5, shown is a detail plan view of a portion of a disc drive incorporating the inertial latching system of the present invention, and showing the action of the inertial latching system of the present invention in response to an applied mechanical shock which tends to rotate the disc drive in a counterclockwise direction. One of skill in the art will appreciate that such an applied mechanical shock tends to move the actuator of the disc drive in a relative clockwise direction as shown by directional arrow 90, i.e., away from the latched position described above with reference to FIG. 2.

Simultaneously, however, the inertial member 70 also moves clockwise relative to the disc drive, as shown by directional arrow 92, to the clockwise latched position shown, thus bringing the CW contact surface 74 into alignment with the latch pin 60. As the inertial member 70 rotates clockwise, the point of contact between the CW contact surface 74 and the latch pin 60 becomes further and further displaced from the axis of rotation of the inertial member 70, due to the eccentric nature of the CW contact surface 74 relative to the rotation axis of the inertial member 70, as noted above. This camming action tends to rotate the actuator back counterclockwise and back into a position of firm engagement between the latch pin 60 and the flux concentrator 62. Thus the clearance noted above for prior art inertial latching systems is eliminated, and the unintended unlatching of the actuator associated with such clearance is also prevented. Furthermore, as will be appreciated by one of skill in the art, the greater the magnitude of the applied mechanical shock, the tighter the inertial latching system of the present invention will hold the actuator, again due to the camming action of the CW contact surface 74.

It will also be noted by one of skill in the art that a point will be reached in the clockwise rotation of the inertial member 70 where contact between the CW contact surface 74, the latch pin 60 and the flux concentrator 62 will provide a limit to the rotation of the inertial member without any additional limit stop components. The amount of maximum clockwise relative motion for the inertial member 70 thus established is presently envisioned to be approximately 25° from the rest position shown in FIG. 2.

From an examination of FIG. 5 it is also apparent that, upon termination of the mechanical shock event, the bias element 84, under influence of the magnetism of the permanent magnets 56, will drive the inertial member 70 in the counterclockwise direction to the rest position, as shown in FIG. 2, thus freeing the actuator for movement except for the influence of the secondary magnetic latching system.

Figure 6:
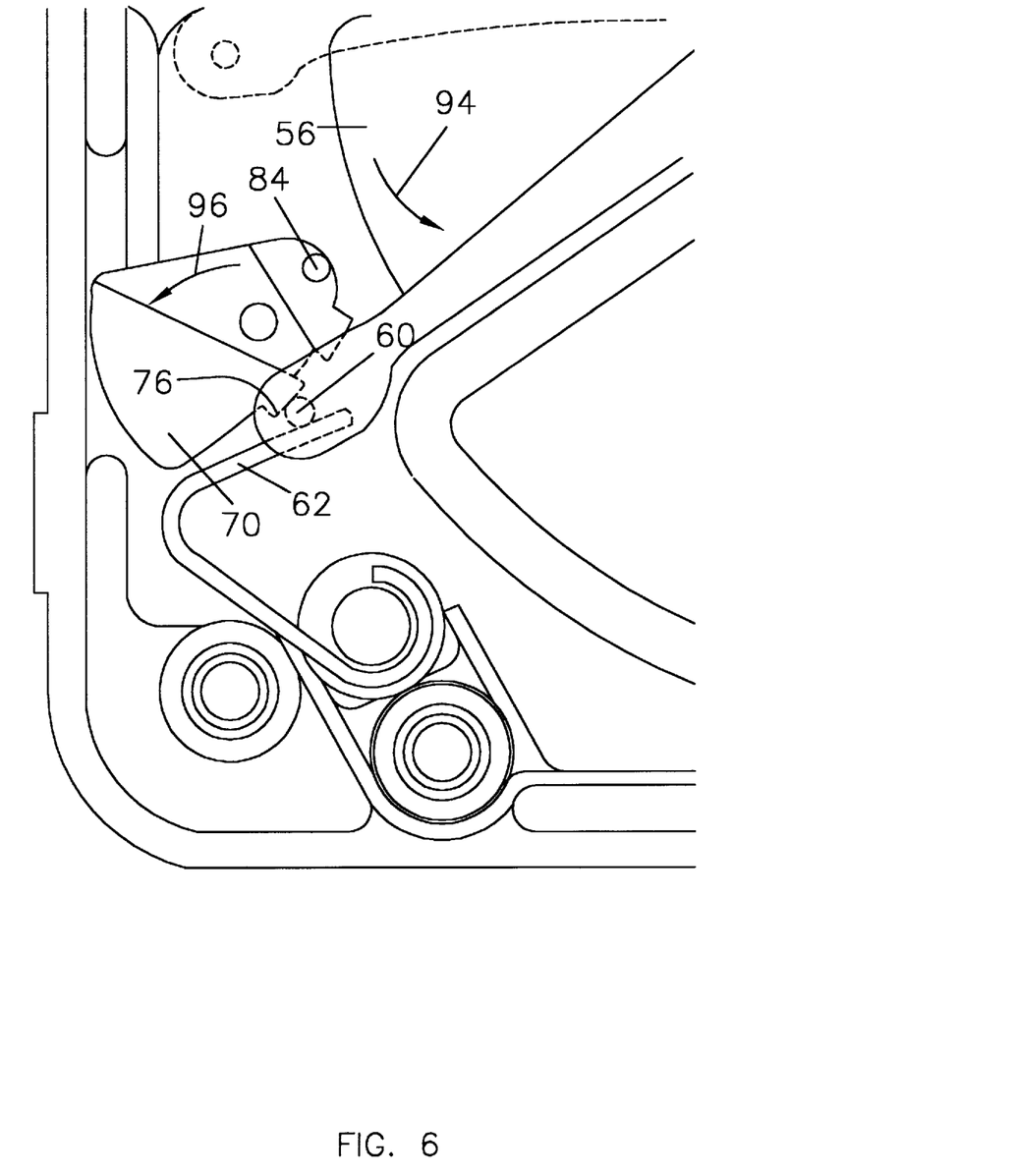
FIG. 6 is a detail plan view of a portion of a disc drive incorporating the latching system of the present invention, and showing the action of the latching system of the present invention in response to an applied mechanical shock which tends to rotate the actuator of the disc drive in a second direction.

Turning now to FIG. 6, shown is a detail plan view of a portion of a disc drive incorporating the latching system of the present invention, and showing the action of the latching system of the present invention in response to an applied mechanical shock which tends to rotate the disc drive in a clockwise direction. One of skill in the art will appreciate that such an applied mechanical shock tends to move the actuator of the disc drive in a relative counterclockwise direction as shown by directional arrow 94, i.e., into a position of tighter engagement between the patch pin 60 and the flux concentrator 62.

Simultaneously the inertial member 70 also moves counterclockwise relative to the disc drive, as shown by directional arrow 96, to the counterclockwise latched position shown, thus bringing the CCW contact surface 76 into alignment with the latch pin 60.

For purposes of the following claims, the term "camming" is intended to define the action of surfaces on a rotating member (the inertial member 70) that are not concentric with the axis of rotation, and thus provide contact with a cooperative contact element (the latch pin 60) at varying radii from the axis of rotation dependent upon the rotational position of the rotating member, as described above in relationship to the description of FIGS. 3-1 through 3-4, and FIGS. 5 and 6. As the inertial member 70 rotates counterclockwise, the camming action of the CCW contact surface 76 acts to encourage the contact pin 60 into closer contact with the flux concentrator 62. One difference between the inertial latching system of the present invention and the prior art noted above in this circumstance lies in the action of the disc drive incorporating the present invention in response to the termination of the mechanical shock event.

It will be recalled that many prior art inertial latching systems function only in a single rotational direction, such as described above in relationship to FIG. 5, and have no operational effect at all in response to shocks applied in the opposite direction. Such designs assumed that shocks which tend to drive the actuator toward the latch position are not a concern. However, as noted above, the force generated by the compliant limit stop at the latch position upon termination of such shocks can be large enough to overcome the secondary latching system and unintentionally release the actuator from the latched position.

With the inertial latching system of the present invention, the inertial member 70 is allowed to rotate both clockwise and counterclockwise in response to applied mechanical shocks. The effect of this bi-directional motion is significant when the applied mechanical shock is in a direction which tends to drive the actuator toward the latched position. When the compliant limit stop at the latch position is allowed to return to its quiescent condition at the termination of the mechanical shock event, the force generated is gradually dissipated by the camming action of the CCW contact surface as the inertial member 70 returns to the rest position of FIG. 2 under the influence of the bias element 84 and the permanent magnets 56 of the VCM. Thus no uncontrolled acceleration of the actuator can occur which would tend to overcome the secondary magnetic latching system and release the actuator.

As will also be apparent to one of skill in the art upon an examination of FIG. 6, the limit to the range of motion of the inertial member 70 in the counterclockwise direction is also determined by contact between the CCW contact surface 76, the latch pin 60 and the flux concentrator 62, and, as was the case for clockwise motion described above in relationship to FIG. 5, is presently envisioned to be approximately 25° from the rest position shown in FIG. 2.

While all preceding discussion of the operation of the inertial latching system of the present invention have described the actions of the inertial latching system in response to rotational mechanical shocks, a person of skill in the art will realize that, due to the unbalanced nature of the inertial member 70 relative to its pivot shaft 72 and due to the positioning of the inertial member 70 relative to the axis of rotation of the actuator, the inertial latching system of the present invention will be equally effective at holding the actuator at the latched position in the presence of translational mechanical shocks. That is, any translational mechanical shock applied to the disc drive will result in appropriate rotation of the inertial member 70 of the inertial latching system, preventing unintended release of the actuator. Again, the bidirectional nature of the inertial member and the presence of the eccentric CW and CCW contact surfaces 74, 76 will act in concert to securely latch the actuator in the presence of applied translational mechanical shocks.

In actual testing of a prototype of the inertial latching system of the present invention, the invention has proven to prevent disengagement of the actuator under rotational mechanical shock accelerations of up to 26,600 radians/second$^2$. This testing was performed on a disc drive whose shock tolerance specification was only 10,000 radians/second$^2$, and the testing thus shows that the inertial latching system of the present invention provides the capability of greatly increasing the shock tolerance specification in future disc drive products.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiment, certain variations and modifications may be suggested to one of skill in the art upon reading this disclosure. Therefore, the scope of the present invention should be considered to be limited only by the following claims.

What is claimed is:

1. A disc drive data storage device, including an actuator having a moving portion and a housing, and an inertial latching system for holding the moving portion of the actuator at a predetermined fixed location relative to the housing in the presence of mechanical shocks applied to the housing of the disc drive, the inertial latching system comprising:

a latching feature carried on the moving portion of the actuator;

a limit stop against which the latching feature is brought to bear when the moving portion of the actuator is at the predetermined fixed location; and an unbalanced inertial member including:
      a pivot shaft; and
      first and second contact surfaces for engaging the latching feature and encouraging the latching feature into contact with the limit stop when application of mechanical shock to the housing of the disc drive causes the inertial member to rotate about the pivot shaft in first and second directions, respectively.

2. A disc drive data storage device as claimed in claim 1 wherein said first and second contact surfaces are in the form of arcs having centers not coincident with the axis of rotation of the pivot shaft, whereby the first and second contact surfaces act as camming surfaces when contacting the latching feature on the moving portion of the actuator.

3. A disc drive data storage device as claimed in claim 1 and further comprising means for moving the inertial member to a rest position upon termination of a mechanical shock event and holding the inertial element at the rest position in the absence of applied mechanical shocks.

4. A disc drive data storage device as claimed in claim 2 and further comprising means for moving the inertial member to a rest position upon termination of a mechanical shock event and holding the inertial element at the rest position in the absence of applied mechanical shocks.

5. A disc drive data storage device, including an actuator having a moving portion and a housing, and an inertial latching system for holding the moving portion of the actuator at a predetermined fixed location relative to the housing in the presence of mechanical shocks applied to the housing of the disc drive, the inertial latching system comprising:

a latching feature carried on the moving portion of the actuator;

an unbalanced inertial member including:
      a pivot shaft;
      first and second contact surfaces for engaging the latching feature when application of mechanical shock to the housing of the disc drive causes the inertial member to rotate about the pivot shaft in first and second directions, respectively, said first and second contact surfaces in the form of arcs having centers not coincident with the axis of rotation of the pivot shaft, whereby the first and second contact surfaces act as camming surfaces when contacting the latching feature on the moving portion of the actuator.

6. A disc drive data storage device as claimed in claim 5 and further comprising means for moving the inertial member to a rest position upon termination of a mechanical shock event and holding the inertial element at the rest position in the absence of applied mechanical shocks.

7. An inertial latching system for holding a moving portion of an actuator in a disc drive at a predetermined fixed location relative to a housing of the disc drive in the presence of mechanical shocks applied to the housing of the disc drive, the inertial latching system comprising:

a latching feature carried on the moving portion of the actuator;

an unbalanced inertial member including:
      a pivot shaft;
      first and second contact surfaces for engaging the latching feature when application of mechanical shock to the housing of the disc drive causes the inertial member to rotate about the pivot shaft in first and second directions, respectively, said first and second contact surfaces in the form of arcs having centers not coincident with the axis of rotation of the pivot shaft, whereby the first and second contact surfaces act as camming surfaces when contacting the latching feature on the moving portion of the actuator.

8. An inertial latching system as claimed in claim 7 further comprising means for moving the inertial member to a rest position upon termination of a mechanical shock event and holding the inertial element at the rest position in the absence of applied mechanical shocks.

9. An inertial latching system for holding a moving portion of an actuator in a disc drive at a predetermined fixed location relative to a housing of the disc drive in the presence of mechanical shocks applied to the housing of the disc drive, the inertial latching system comprising:

a latching feature carried on the moving portion of the actuator;

a limit stop against which the latching feature is brought to bear when the moving portion of the actuator is at the predetermined fixed location; and an unbalanced inertial member including:
      a pivot shaft; and
      first and second contact surfaces for engaging the latching feature and encouraging the latching feature into contact with the limit stop when application of mechanical shock to the housing of the disc drive causes the inertial member to rotate about the pivot shaft in first and second directions, respectively.

10. An inertial latching system as claimed in claim 9 further comprising means for moving the inertial member to a rest position upon termination of a mechanical shock event and holding the inertial element at the rest position in the absence of applied mechanical shocks.

11. An inertial latching system as claimed in claim 9 wherein said first and second contact surfaces are in the form of arcs having centers not coincident with the axis of rotation of the pivot shaft, whereby the first and second contact surfaces act as camming surfaces when contacting the latching feature on the moving portion of the actuator.

12. An inertial latching system as claimed in claim 11 further comprising means for moving the inertial member to a rest position upon termination of a mechanical shock event and holding the inertial element at the rest position in the absence of applied mechanical shocks.

13. A disc drive data storage device, including an actuator having a moving portion and a housing, and an inertial latching system for holding the moving portion of the actuator at a predetermined fixed location relative to the housing in the presence of mechanical shocks applied to the housing of the disc drive, the inertial latching system comprising:

a latching feature carried on the moving portion of the actuator;

an unbalanced inertial member including:
  a pivot shaft;
  first and second contact surfaces for engaging the latching feature when application of mechanical shock to the housing of the disc drive causes the inertial member to rotate about the pivot shaft in first and second directions, respectively, said first and second contact surfaces in the form of arcs having centers not coincident with the axis of rotation of the pivot shaft, whereby the first and second contact surfaces act as camming surfaces when contacting the latching feature on the moving portion of the actuator, and
  means for moving the inertial member to a rest position upon termination of a mechanical shock event and holding the inertial element at the rest position in the absence of applied mechanical shocks.

14. An inertial latching system for holding a moving portion of an actuator in a disc drive at a predetermined fixed location relative to a housing of the disc drive in the presence of mechanical shocks applied to the housing of the disc drive, the inertial latching system comprising:

a latching feature carried on the moving portion of the actuator;

an unbalanced inertial member including:
  a pivot shaft;
  first and second contact surfaces for engaging the latching feature when application of mechanical shock to the housing of the disc drive causes the inertial member to rotate about the pivot shaft in first and second directions, respectively, said first and second contact surfaces in the form of arcs having centers not coincident with the axis of rotation of the pivot shaft, whereby the first and second contact surfaces act as camming surfaces when contacting the latching feature on the moving portion of the actuator, and
  means for moving the inertial member to a rest position upon termination of a mechanical shock event and holding the inertial element at the rest position in the absence of applied mechanical shocks.

* * * * *